United States Patent [19]

Wolbers et al.

[11] Patent Number: 5,588,780
[45] Date of Patent: Dec. 31, 1996

[54] METHOD AND INSTALLATION FOR LAYING A PIPE-LINE

[75] Inventors: Dick R. Wolbers, 's-Gravenhage; Ronkers Koerse, Twisk, both of Netherlands

[73] Assignee: All Seas Group S.A., Switzerland

[21] Appl. No.: 475,802

[22] Filed: Jun. 7, 1995

[30] Foreign Application Priority Data

Aug. 6, 1994 [NL] Netherlands ............... 9400933

[51] Int. Cl.⁶ .................................. F16L 1/12
[52] U.S. Cl. .............. 405/170; 138/149; 285/47; 285/915
[58] Field of Search ............... 405/166, 167, 405/170, 258; 285/45, 47, 915; 138/149

[56] References Cited

U.S. PATENT DOCUMENTS

| | | | |
|---|---|---|---|
| 4,100,751 | 7/1978 | Thomason | 405/155 |
| 4,103,505 | 8/1978 | Howerton | 405/166 |
| 4,162,093 | 7/1979 | Sigmund | 285/47 |
| 4,289,172 | 9/1981 | Ekstrom | 138/149 |
| 4,459,251 | 7/1984 | Elridge et al. | 285/47 X |
| 4,509,561 | 4/1985 | Litz | 138/149 |
| 4,808,031 | 2/1989 | Baker | 405/166 X |
| 4,909,669 | 3/1990 | Baker | 405/166 X |
| 5,186,217 | 2/1993 | Kallinich et al. | 138/149 |

FOREIGN PATENT DOCUMENTS 2232740 12/1990 United Kingdom.

*Primary Examiner*—Roger J. Schoeppel
*Attorney, Agent, or Firm*—Mark Zovko

[57] ABSTRACT

The invention relates to a method for laying a pipe-line, wherein pipes are welded to each other along a ring weld and wherein the ring weld is covered with a mastic ring.

In the known method of this type the mastic of asphalt bitumen is melted and cast into a mould arranged round the ring weld.

Working with a hot substance (180° C.) is dangerous. The vapours from melted asphalt bitumen create an unpleasant and unhealthy work climate. The quality of asphalt bitumen deteriorates the more melted it becomes.

The invention has for its object to provide a method wherein the above stated and/or other drawbacks occur either at least to a lesser extent or not at all. To this end the method according to the invention has the feature that the mastic is arranged substantially in plastic condition around the ring weld.

9 Claims, 8 Drawing Sheets

METHOD AND INSTALLATION FOR LAYING A PIPE-LINE

The invention relates to a method for laying a pipe-line, wherein pipes are welded to each other along a ring weld and wherein the ring weld is covered with a mastic ring.

In the known method of this type the mastic of asphalt bitumen is melted and cast into a mould arranged round the ring weld.

Working with a hot substance (180° C.) is dangerous. The vapours from melted asphalt bitumen create an unpleasant and unhealthy work climate. The quality of asphalt bitumen deteriorates the more melted it becomes. Because the mastic remains in soft state for a long time after casting, the mastic ring can only be arranged behind the last draw bench. The moulds consist of steel bands which remain present on the pipe-line. These bands snap open after a period of rust and then form hooks on which fishing nets are ripped open.

The invention has for its object to provide a method wherein the above stated drawbacks occur either at least to a lesser extent or not at all. To this end the method according to the invention has the characteristic of claim 1.

The invention also relates to and provides an installation as according to claim 6.

Mentioned and other features of the invention will become apparent from the description of a number of embodiments according to the invention following hereinbelow. In the drawing in schematic form.

Using a pipe-layer, for instance as described and drawn in GB-2232740, a pipe-line is laid on a seabed. The content of GB-2232740 is deemed to be interpolated in this description.

Figure 3:
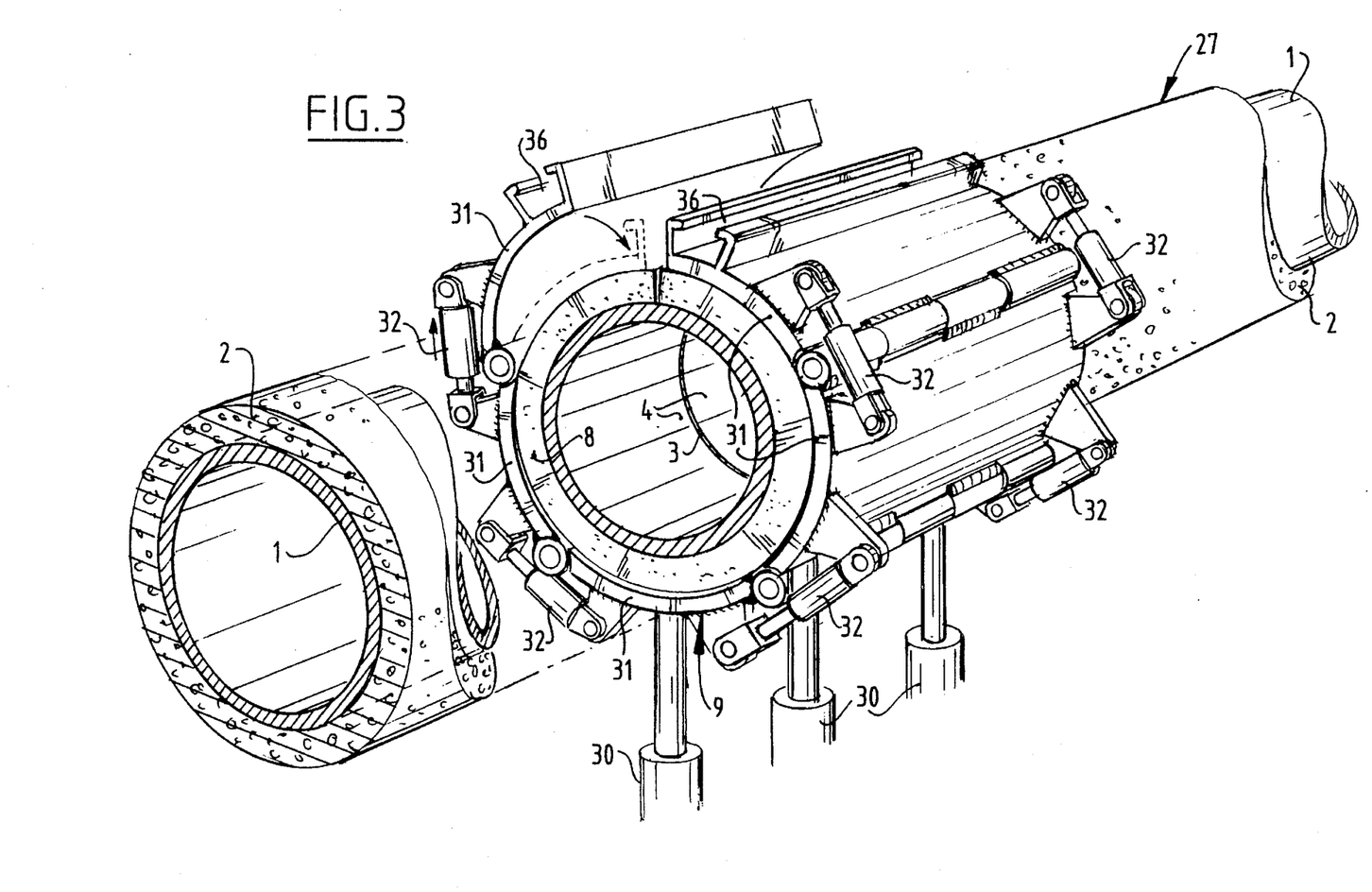
FIG. 3 shows on larger scale a perspective view of fraction III of FIG. 1 at a later stage.
Figure 4:
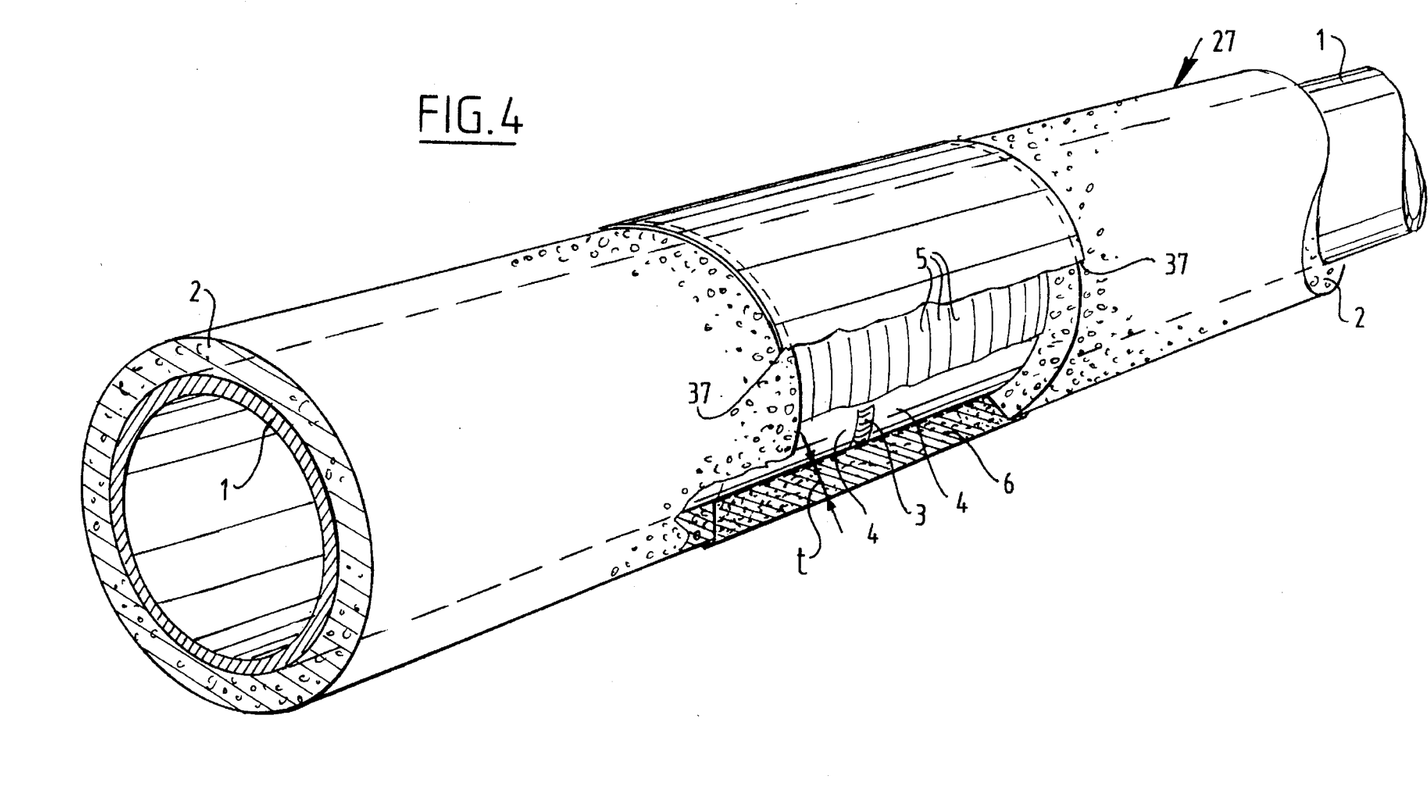
FIG. 4 shows a perspective view of a piece of pipe-line finished according to the invention.

Steel pipes, which with the exception of their ends 4 have a concrete jacket 2, are herein welded to each other along a ring weld 3 (see FIG. 3). The ends 4 are first wrapped with an anti-corrosion covering 5, consisting for instance of a PVC/bitumen wrapping which is adhered to the steel ends 4 and the ring weld 3 or is fused thereon.

The remaining space 7 between the concrete jackets 2 is then filled up with a mastic ring 6, for instance of asphalt bitumen, by means of the method according to the invention.

Figure 1:
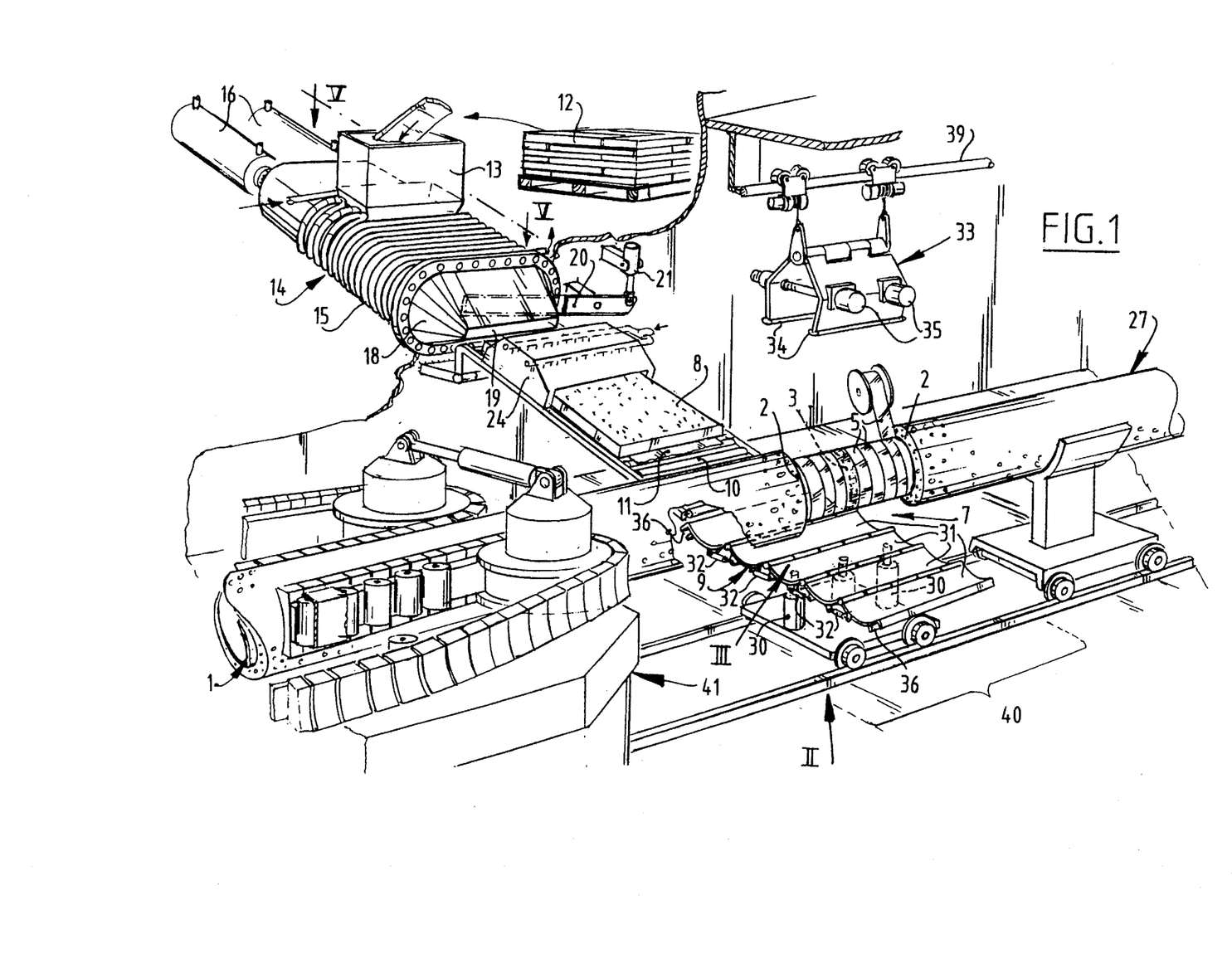
FIG. 1 shows a perspective view of a fraction of a pipe-layer according to the invention.
Figure 2:
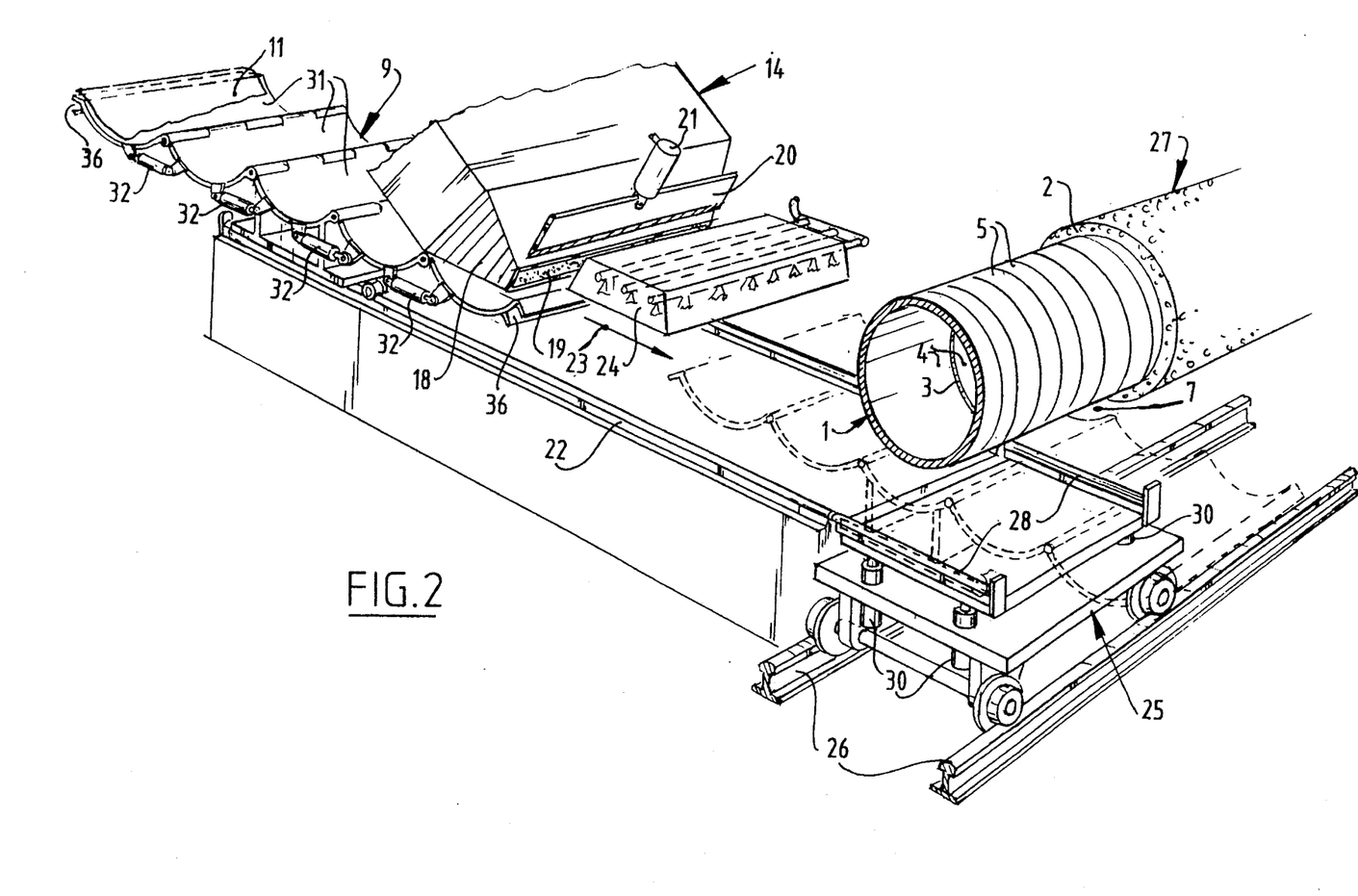
FIG. 2 shows on larger scale a perspective view of fraction II relating to another embodiment.
Figure 5:
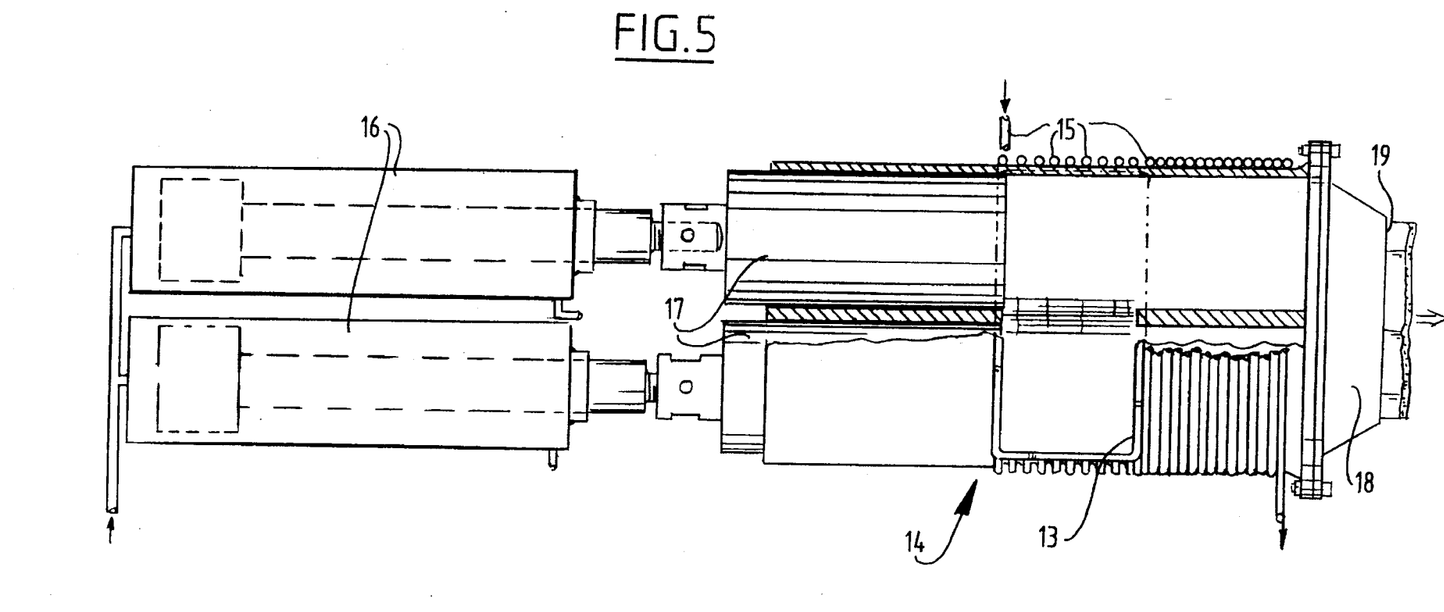
FIG. 5 shows on larger scale a broken away view according to arrows V—V in FIG. 1.

As according to FIG. 1, pieces of mastic 12 pre-heated for instance by means of warm water to a temperature of for example 60° C. are supplied to the inlet 13 of a mastic press 14 which is provided with heating means 15, for instance a hot liquid pipe, plungers 17 driven by cylinders 16 and a discharge funnel 18 with a discharge mouth 19 (FIGS. 1 and 5) which is closed by a knife 20. In the press 14 the mastic is kept warm, for instance at 60° C., preferably at a somewhat lower temperature such as 50° C. or for example about 30°–40° C., that is at a temperature wherein the mastic is plastic. This mastic is pressed by the plungers 17 to a homogeneous mass with mouth 19 closed. When the knife 20 is placed in the opened position by means of a drive device 21, the mastic is driven out by plungers 17 as a strip 8 onto a folded-out ring press 9 which is optionally covered with a foil 11 and which according to FIG. 2 runs over a rail 22 under mouth 19 as according to arrow 23. The strip 8 therein settles onto the ring press 9. The upper side of strip 8 is additionally heated, for instance by means of a radiant heater 24. The upper side of strip 8 or the anti-corrosion covering arranged on ring weld 3 is optionally also coated with an adhesive primer. When a strip 8 of sufficient length has been driven out it is severed with the knife 20, while the mouth 19 is closed. The ring press 9 with strip 8 is then moved onto transverse rails 28 of a carriage 25 which is displaceable over rails 26 in lengthwise direction of the pipe-layer and in lengthwise direction of the pipe string 27. It is also conceivable that the strip 8 leaving the extrusion press 18 as according to FIG. 1 is collected on a roller conveyor 10 and that strip 8 is then pulled onto the folded-out ring press 9.

When carriage 25 with loaded ring press 9 is situated under a space 7, the ring press 9 is lifted by means of hoisting means 30 until the strip 8 contacts the underside of covering 5 and the ring press 9 is closed by means of jacks 32 arranged between successive ring press sections 31. The strip 8 is herein placed round the wrapping 5, wherein the additionally heated and tacky inner side adheres well. Finally, the ring press 9 is optionally pressed tightly together by means of a pinch 33, of which clamping jaws 34 press the press edges 36 with great force toward each other by means of jacks 35. The volume of strip 8 is amply dimensioned such that mastic collars 37 are formed between the ends of ring press 9 and the jackets 2. After forming of the mastic ring 6 the ring press 9 is opened and removed. The pincer 33 is suspended for displacement on a rail 39 and runs back and forth in longitudinal direction of pipe string 27. While the strip 8 is arranged in a space 7 with a first ring press 9, the following strip 8 can be arranged on a second ring press 9. Because arranging of the mastic ring 6 with the ring press 9 takes place so easily and quickly, only one ring press 9 will usually suffice. A plurality of stations, for instance two, each with a ring press 9 and an extrusion press 14 are preferably equipped per station.

In contrast to known pipe-layers, another per se known draw bench 41 can be disposed according to the invention behind the device 40 for arranging a strip 8, which bench together with other draw benches exerts the tractive force on pipe string 27 required to hold it fixedly on the pipe-layer floating on water.

Figure 6:
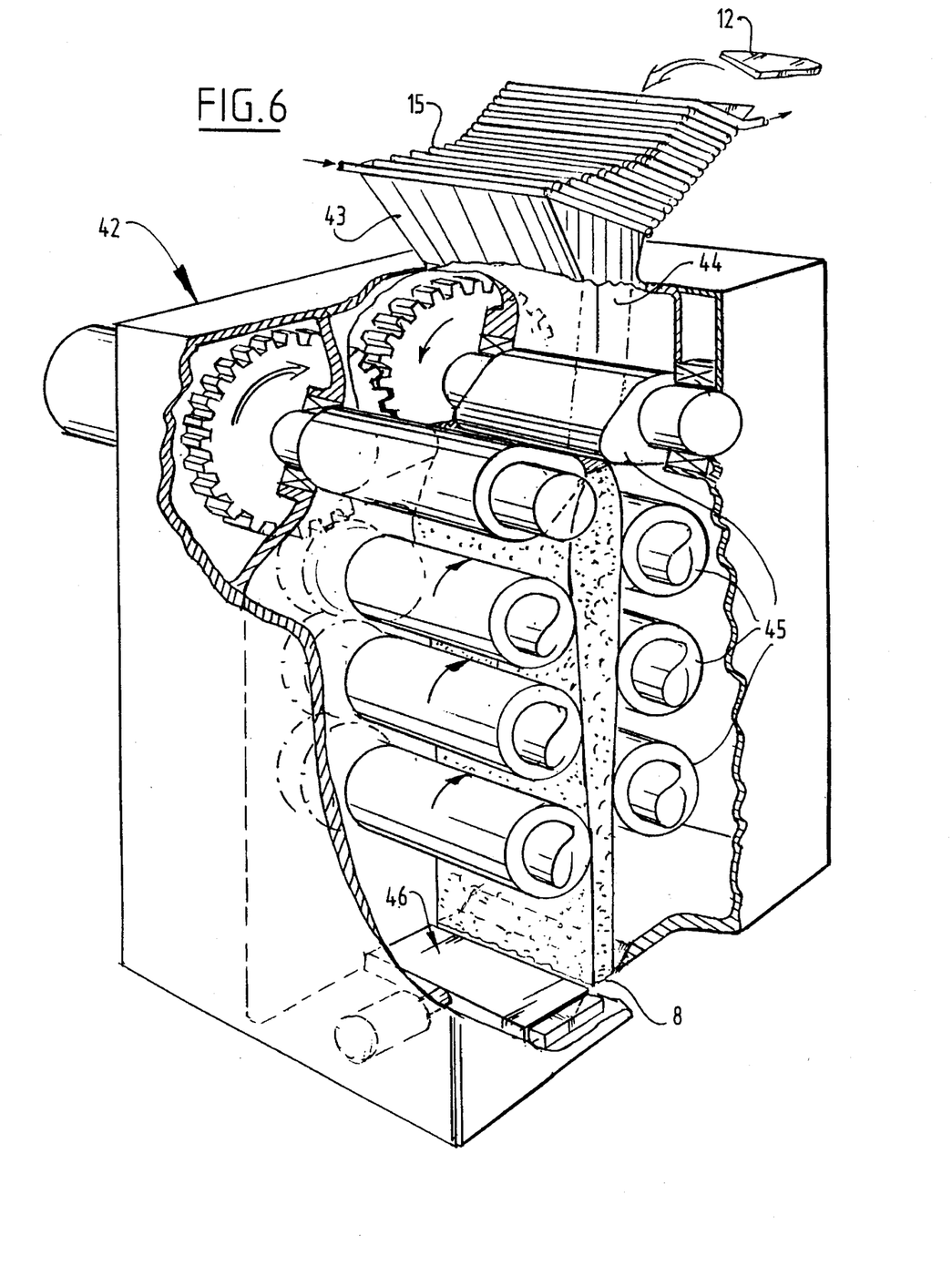
FIGS. 6 and 7 show cut away perspective views of variants of FIG. 5.

The strip press 42 of FIG. 6 comprises a funnel 43 with heating means 15. From a wide outflow opening 44 flows a plastic string which is rolled to a thin strip 8 by round or non-round, centric or eccentric rollers 45 and then cut by shears 46.

Figure 7:
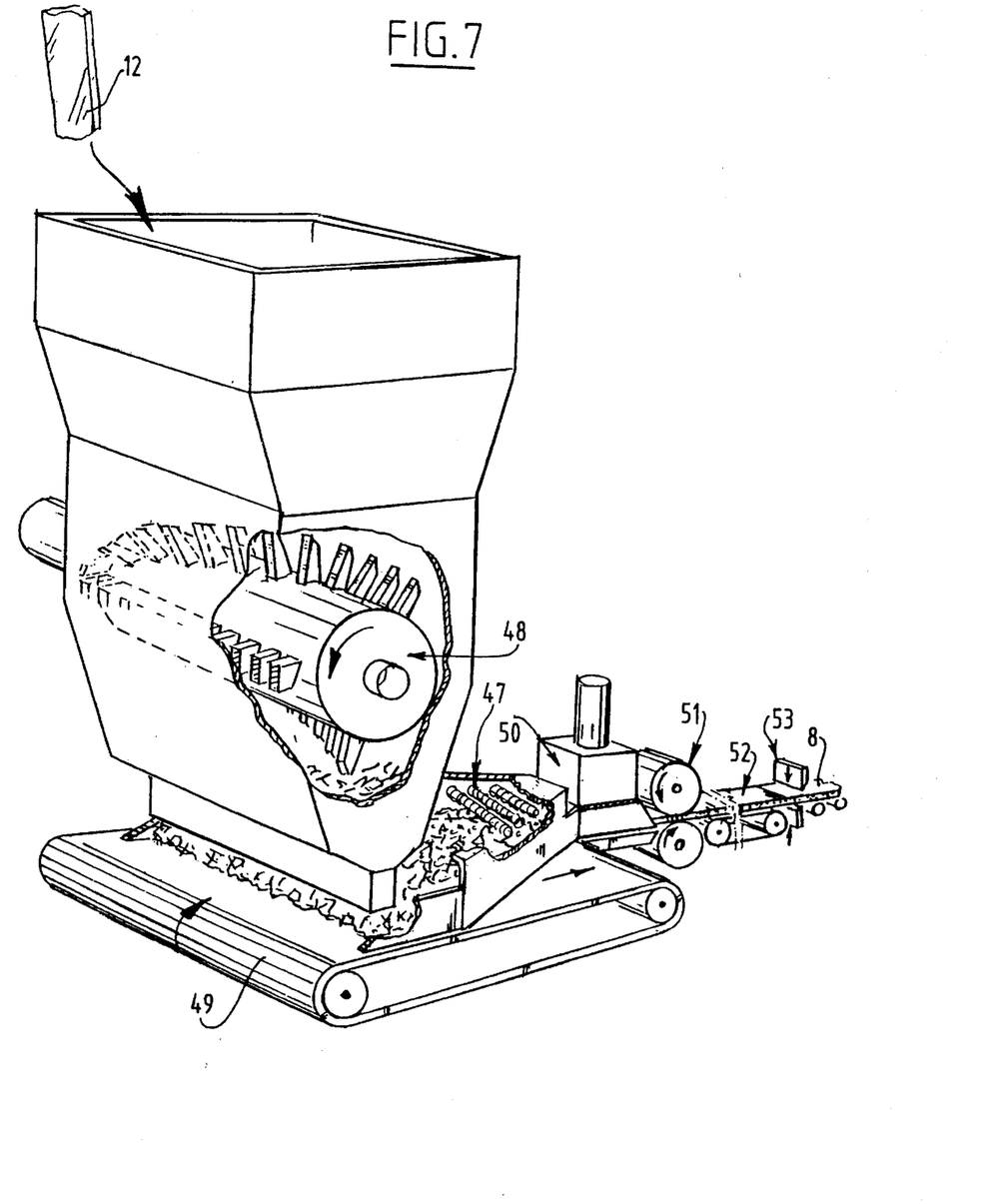

In the strip former 47 of FIG. 7 introduced slices 12 are shredded by means of a cutting roller 48 and deposited on a conveyor belt 49, then heated and transported through a press 50 and a roller 51, whereafter strips 8 of a required length are cut from a string 52 by means of shears 53.

Diverse methods and devices can be envisaged for forming a strip 8 of mastic in plastic condition at a temperature between 30° and 60° C., preferably about 50° C. A somewhat higher temperature is conceivable, subject also to the material used. Diverse forms of press can further be envisaged for pressing the plastic mastic into the space 7. The strips could be pressed into the space for instance with rollers which would describe an arcuate or annular path round the space 7.

Figure 8:
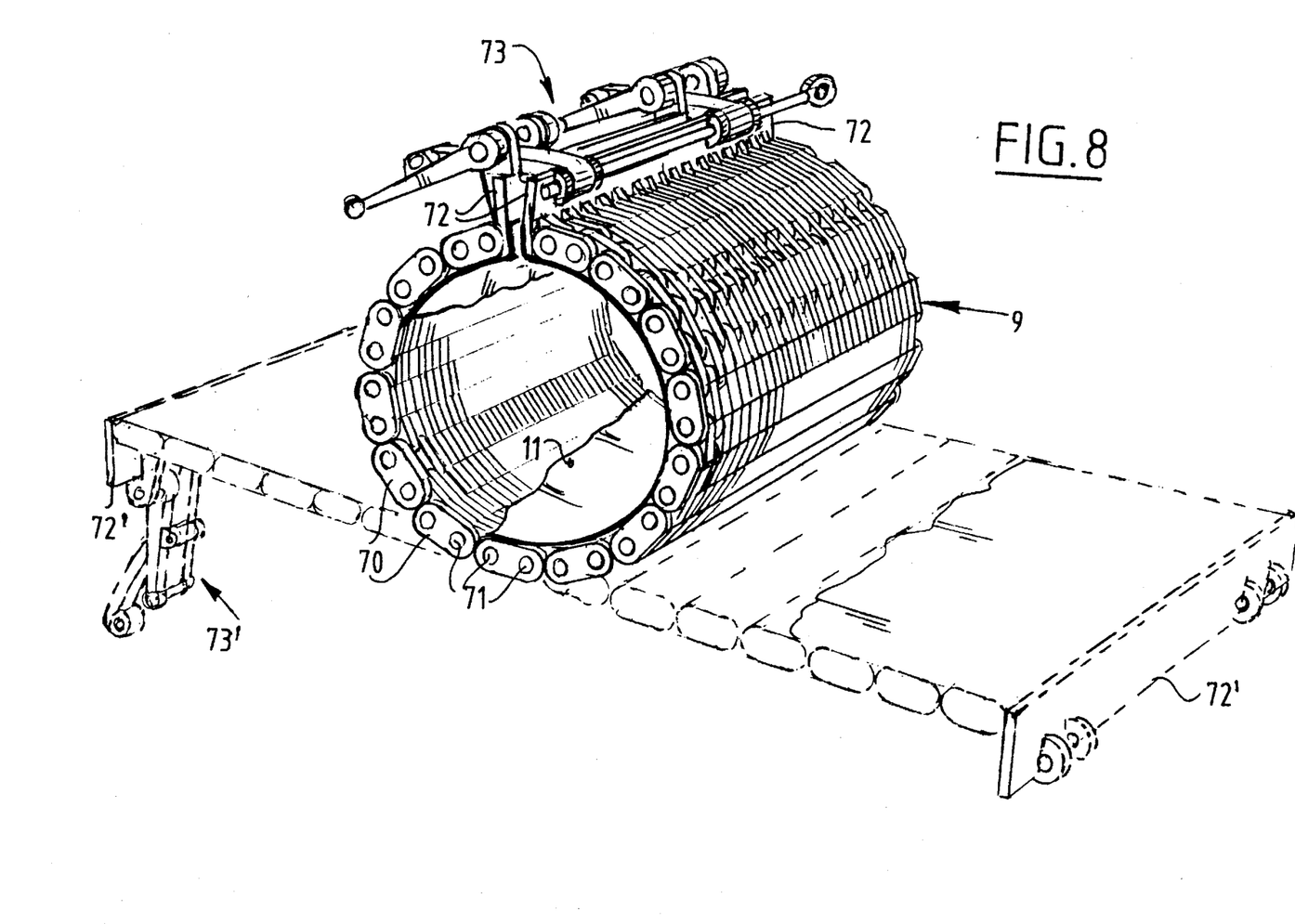
FIG. 8 is a perspective view of a variant of FIG. 3.

Shown in FIG. 8 is a ring press 9 consisting of a chain link band 70 with common link shafts 71 disposed adjacently of each other. This band has edge lips 72 which are closed with force with a clamp closure 73. In preference a flexible foil 11, for instance of paper, is herein laid between the link band 70 and the strip 8.

The cross-sectional shape of strip 8 can be changed by giving the mouth 19 of the mastic press another outlet funnel with the desired shape. Strip 8 is preferably narrower than the space 7 and shorter than the periphery of the space but substantially thicker than the concrete layer thickness.

It is conceivable for the strips 8 to be made beforehand to size in solid form and to be brought slowly and homogeneously to a working temperature of for instance 30°–60° C., for example 50° C., for instance with a microwave oven or in warm water while they optionally lie on a sheet of paper or the like. Such a plastic strip is then for instance arranged in space 7 and pressed into this space 7 with considerable force by means of a press consisting of two or more ring parts. Herein the said outer sheet can even remain adhered to the mastic.

The said rings of mastic have a thickness t of more than 30 mm. The mastic has for instance the specification D2S. This means that it comprises:

15% by weight Bitumen (R85/25)
17% by weight Filler (limestone)
68% by weight Aggregate (grain size 0–5 mm).

There can be envisaged herein:

that a different type of bitumen is used;

a variation in the percentage by weight of the bitumen in the mastic, for instance between 10 and 20%;

a variation of between 10 and 20% in the percentage by weight of the filler;

a variation of the aggregate size between grain size 0–5 mm and 0–20 mm; and a variation in the type of aggregate.

TYPICAL COMPOSITIONS OF SPECIAL MASTICS COVERED BY BP PATENTS

| | For Conventional Pipe-line use | |
|---|---|---|
| D1/S | 17.0% by weight | Bitumen R85/25 |
| | 20.0% by weight | Filler (Limestone) |
| | 63.0% by weight | Aggregate (0–2.36 mm) |
| D2/S | 15.0% by weight | Bitumen R85/25 |
| | 17.0% by weight | Filler (Limestone) |
| | 68.0% by weight | Aggregate (0–5.0 mm) |
| D3/S | 13.0% by weight | Bitumen R85/25 |
| | 15.0% by weight | Filler (Limestone) |
| | 72.0% by weight | Aggregate (0–10.0 mm) |
| D4/S | 11.0% by weight | Bitumen R85/25 |
| | 13.0% by weight | Filler (Limestone) |
| | 76.0% by weight | Aggregate (0–20.0 mm) |
| | For High Temperature Pipe-line use | |
| D1/HS | 18.0% by weight | Bitumen R105/35 |
| | 20.0% by weight | Filler (Limestone) |
| | 60.0% by weight | Aggregate (0–2.36 mm) |
| D2/HS | 16.0% by weight | Bitumen R105/35 |
| | 18.0% by weight | Filler (Limestone) |
| | 66.0% by weight | Aggregate (0–5.0 mm) |
| D3/HS | 14.0% by weight | Bitumen R105/35 |
| | 16.0% by weight | Filler (Limestone) |
| | 70.0% by weight | Aggregate (0–10.0 mm) |
| D4/HS | 12.0% by weight | Bitumen R105/35 |
| | 14.0% by weight | Filler (Limestone) |
| | 74.0% by weight | Aggregate (0–20.0 mm) |

The marine mastic consists of an oxidised grade bitumen with filler and aggregate all as fully described under the following headings: Bituminous Binder, Limestone Filler and Aggregates respectively to produce a high-density mastic.

Bituminous Binder

This bitumen will be delivered by our nominated supplier in bulk form by road tanker and discharged into our heated bitumen storage tanks. The properties of this bitumen will be as follows:

| Marine Mastic | 'S' Type | 'HS' Type |
|---|---|---|
| Type: Oxidase bitumen: Grade | 85/25 | 105/35 |
| Softening Point (Ring & Ball) | 80–90° C. | 100–110° C. |
| Penetration at 25° C. | 25 ± 5 | 32 ± 5 |
| Loss on heating for 5 h at 163° C. (% by mass) | 0.2 | 0.2 |
| Solubility in trichloroethylene % by mass (min) | 99.5 | 99.5 |

Aggregates

The mineral aggregate will be clean bank, river, dune pit or quarry sand either naturally occurring or produced by crushing. The aggregate will be substantially free of clay, loam and organic matter.

We claim:

1. Method for laying a pipe-line (27) on a seabed, wherein pipes on a vessel are welded to each other along a ring weld (3) and wherein the ring weld (3) is covered with a ring of mastic (6), the thickness of which is greater than 30 mm, which mastic comprises bitumen and filler, characterized in that the mastic is arranged around the ring weld (3), said mastic at a temperature wherein it is in a deformable state.

2. Method as claimed in claim 1, characterized in that at least one mastic strip (8) is formed at a time and the mastic strip (8) is arranged around the ring weld (3), said mastic strip being in a deformable state.

3. Method as claimed in claim 2, characterized in that the mastic strip arranged around the ring weld (3) is pressed together using a ring press (9).

4. Method as claimed in claim 1, characterized in that in the case of pipes (1) which, with the exception of their ends (4), are covered with a hardened concrete jacket (2), the space (7) between two successive concrete jackets (2), having a ring weld joining said pipes, said space being filled in each case with an excess of deformable mastic mass such that during pressing together of the mastic mass by means of a ring press (9) fractions of mastic mass cover the concrete jackets (2) adjoining the space with a mastic collar (37).

5. Method as claimed in claim 1, characterized in that around the ring weld (3) is placed at least one strip (8) of mastic, the side of which facing toward the ring weld (3) is more deformable than the side facing away from the ring weld.

6. Method as claimed in claim 1, characterized in that the mastic is heated by means of microwaves in order to render it in a deformable condition.

7. Apparatus for situating a strip of deformable mastic around two sections of pipe joined by a ring weld comprising forming means for forming a deformable mastic strip, and clamping means for clamping the mastic strip around said ring weld, said clamping means having a plurality of semi-annular ring pieces connected such that said ring pieces can be arranged to substantially encircle said ring weld thereby pressing said mastic strip over said ring weld.

8. The apparatus of claim 7, which includes compressing means such that the pressure on said mastic strip exerted by said clamping means can be varied.

9. Apparatus as claimed in claim 8, characterized in that a tensioning device (41) for fixedly holding a pipe-string (27) for laying on a seabed is placed behind the apparatus for situating a strip of deformable mastic around two pipe sections.

* * * * *